United States Patent [19]

Onogi

[11] 4,343,545
[45] Aug. 10, 1982

[54] APPARATUS FOR STOPPING THE MOTOR OF A MOTOR DRIVE MECHANISM IN A CAMERA

[75] Inventor: Kenji Onogi, Yokohama, Japan
[73] Assignee: Nippon Kogaku K.K., Tokyo, Japan
[21] Appl. No.: 166,793
[22] Filed: Jul. 8, 1980
[30] Foreign Application Priority Data
Jul. 12, 1979 [JP] Japan .............................. 54-95056[U]
[51] Int. Cl.³ .............................................. G03B 1/18
[52] U.S. Cl. .................................. 354/173; 354/212; 354/213
[58] Field of Search ................ 354/173, 212, 213, 214

[56] References Cited
U.S. PATENT DOCUMENTS

| | | | |
|---|---|---|---|
| 3,940,776 | 2/1976 | Kondo | 354/173 |
| 4,084,169 | 4/1978 | Iwata et al. | 354/173 |
| 4,122,471 | 10/1978 | Takahata | 354/173 |
| 4,182,562 | 1/1980 | Iwashita et al. | 354/173 |
| 4,190,341 | 2/1980 | Sugimori | 354/173 |
| 4,229,091 | 10/1980 | Date et al. | 354/173 |

*Primary Examiner*—Russell E. Adams
*Attorney, Agent, or Firm*—Shapiro and Shapiro

[57] ABSTRACT

Apparatus for stopping the motor of a motor drive mechanism in a camera is disclosed. The motor drive mechanism is of the type in which the motor is started driving by a film winding start signal and is stopped by a signal obtained at the moment of a film winding end signal being produced. Apparatus for stopping the motor according to the invention comprises a timer circuit and means for detecting an abnormality. The timer circuit normally outputs a first signal after the generation of the film winding start signal and before the generation of the film winding end signal, and also outputs a second signal after the generation of the film winding end signal. If the film winding end signal is being generating at the time of output of the first signal or if the film winding end signal has not yet been produced at the time of output of the second signal, said abnormality detecting means delivers to the motor drive mechanism a signal for stopping the motor.

12 Claims, 5 Drawing Figures

4,343,545

APPARATUS FOR STOPPING THE MOTOR OF A MOTOR DRIVE MECHANISM IN A CAMERA

BACKGROUND OF THE INVENTION

1. Field of the Invention

The present invention relates to apparatus for stopping the motor of a motor drive mechanism in a camera.

2. Description of the Prior Art

The motor drive mechanism in a camera is provided to drive a motor for winding up the film. The motor is started by means of a film winding start signal, and stopped by means of a film winding end signal. Usually, the film winding start signal is formed by a signal indicating that a shutter operation has come to end and the film winding end signal is formed by a signal indicating that the winding of one frame length of film has been completed.

The above-mentioned type of motor drive mechanism involves an important problem. In the motor drive mechanism, the motor continues to rotates unless the signal indicating completion of film winding is generated properly. Therefore, if a malfunction occurs such that the film is wound beyond the last frame of the useful length of the film, or if the film is jammed during winding, the motor would be overloaded. In this case, the motor produces an excessively large force which may break the perforations of the film.

To solve the problem it has already been proposed to detect an overcurrent condition in the motor and stop the motor by means of the detection signal. However, there are various types of films in the market and generally different levels of film feeding torque are applied to different types of films. Since the above known solution uses, as the reference current value, a certain predetermined value common to all of different films to stop the motor, it is very difficult to properly stop the motor before the film perforation is broken for all types of films.

As another solution to the above problem, it has been also proposed to preset a desired number of film frames at a counter and mechanically stop the motor when the number of pictures taken by the camera reaches the preset number. According to the second solution, it is possible to stop the motor without fail after a certain number of picture have been taken. However, this solution imposes upon users of the camera the requirement of presetting for each roll of film the number prior to beginning photography. In addition, even employing this solution there still remains unsolved the problem that the motor may be overloaded in the event of film jamming.

SUMMARY OF THE INVENTION

Accordingly, it is an object of the invention to provide an improved apparatus for stopping the motor of a motor drive mechanism in camera which enables stopping the motor without fail when the winding of film is no longer possible and/or when the winding of film is accidentally made impossible, and which can perform this function without the need of presetting the number of pictures in a roll prior to taking the pictures.

Other and further objects, features and advantages of the invention will appear more fully from the following description taken in connection with the accompanying drawings.

DESCRIPTION OF THE PREFERRED EMBODIMENTS

Figure 1:
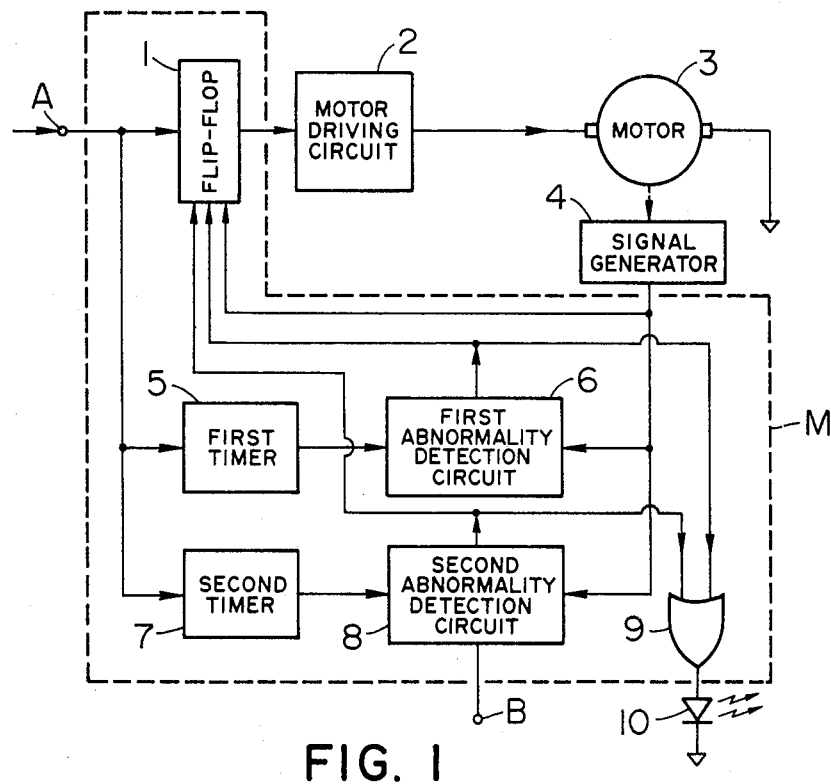
FIG. 1 is a block diagram of a motor stopping apparatus for a motor drive mechanism in a camera showing an embodiment of the invention.

In the embodiment shown in FIG. 1, the apparatus includes a flip-flop 1 which is set by a shutter operation end signal applied to an input terminal A. The shutter operation end signal can be obtained in a suitable manner known per se. For example, when a picture is taken as a single frame shot, the shutter operation end signal may be produced by releasing the shutter button in the camera. When the flip-flop 1 is set, a motor 3 is driven by a motor drive circuit 2 to start winding the film. As soon as one frame length of the film has been completely wound up by the motor 3, a film winding end signal is issued from a signal generator 4, which may be composed of a cam or other mechanism interlocked with the rotation of the motor 3, for example. A signal obtained at the moment of the film winding end signal being generated constitutes a signal for resetting the flip-flop 1. Resetting of the flip-flop 1 makes the motor driving circuit 2 stop the rotation of the motor 3. A first timer 5 starts counting time upon receiving the shutter operation end signal that serves as a film winding start signal, and generates a first timer signal after a predetermined elapsed time that is within the time period required to wind up one frame length of film.

A first abnormality detection circuit 6 has two input terminals which receive the outputs from signal generator 4 and the first timer 5, respectively. The first abnormality detection circuit 6 outputs a resetting signal to the flip-flop 1 only when the signal generator 4 is generating a film winding end signal at the time that first timer signal is input into the detector. The first abnormality detection circuit 6 may be constituted as, for example, an AND circuit. A second timer 7 also starts counting time upon receiving the shutter operation end signal, that is, upon receiving the film winding start signal, and produces a second timer signal after a predetermined elapsed time longer than the time normally required to wind up one frame length of film. It is recommended that the elapsed time at which said second timer signal is produced should be determined by experiments so as to come a little after the longest expected winding time required for one frame length of such film to be completely wound up.

A second abnormality detection circuit 8 has two input terminals which receive the outputs from the signal generator 4 and the second timer 7. The second abnormality detector 7 generates a resetting signal to the flip-flop 1 only when no film winding end signal is being generating by the signal generator 4 at the time that said second timer signal is input to the detector 8. Like the above-mentioned first abnormality detection circuit, this second abnormality detection circuit 8 may be constituted as, for example, an AND circuit. When a film winding end signal is being generated by the signal generator 4 at the time that said second timer signal is introduced into the second abnormality detection circuit 8, it generates at its output terminal B a shot enabling signal indicating that the apparatus is in position and ready for the next shot. This shot enabling signal may be used also to initiate the next exposure when continuous pictures are to be taken.

An OR gate 9 generates a signal for turning on a display element 10 (serving as warning means) which may be, for example, a light emitting diode, only when at least either one of the first or second abnormality detection circuits is generating the resetting signal. Lighting of the diode 10 indicates to the operator of the camera that the motor 3 is stopped in the middle of film winding. As a warning means, any suitable means other than the warning means shown in the embodiment may be employed. For example, acoustic warning means may be employed in place of the diode 10. Also, the first and second timers 5 and 7 may be replaced by one single timer circuit which can produce a first and a second timer signal in time series.

Figure 2:
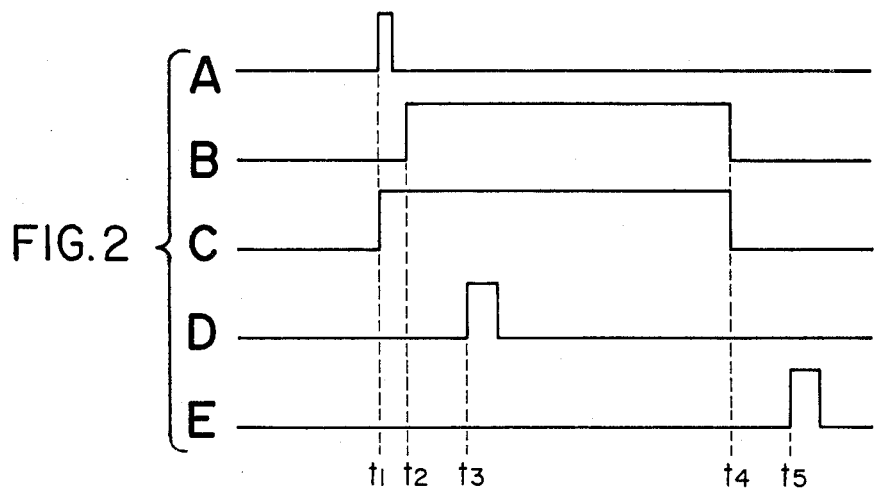
FIGS. 2, 3 and 4 show time charts illustrate the manner of operation of the apparatus shown in FIG. 1, in which time is shown on the abscissa and signal level on the ordinate.
Figure 3:
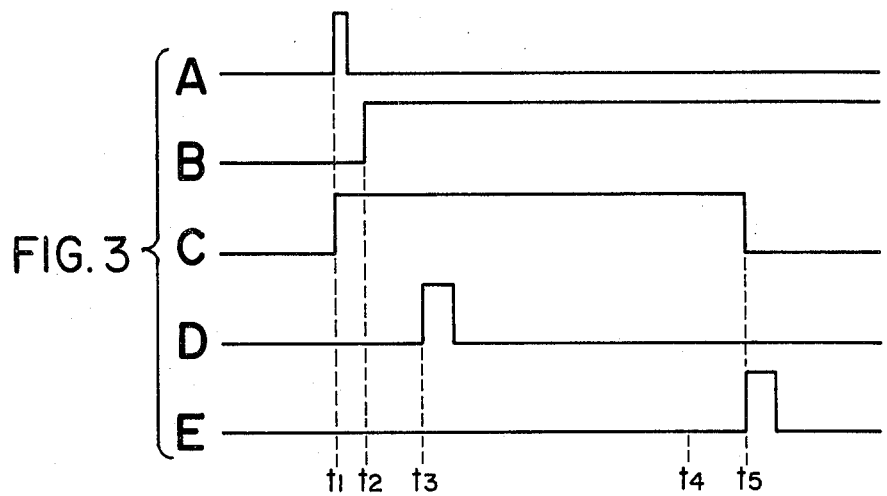
Figure 4:
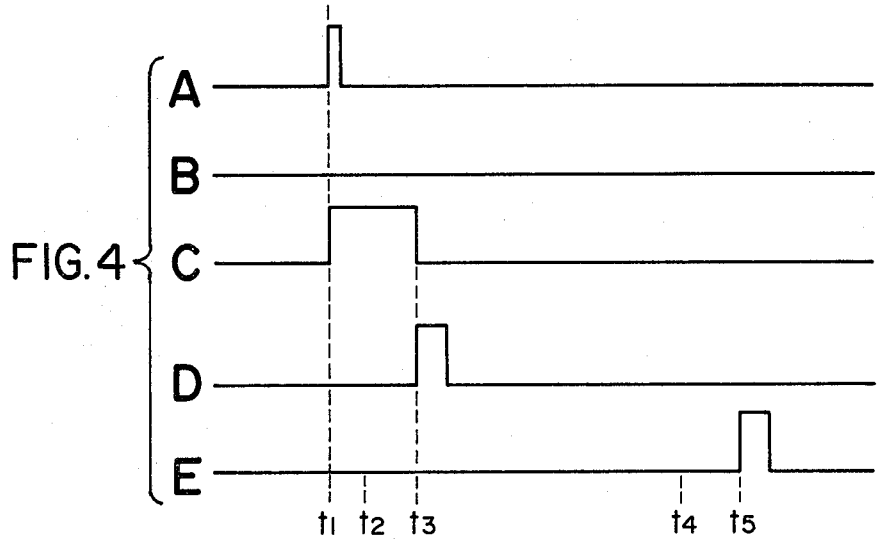

The manner of operation of the apparatus shown in FIG. 1 will be described hereinafter with reference to the timing charts shown in FIGS. 2 through 4.

FIGS. 2A–E show timing charts of the apparatus in a normal operational sequence. In response to a shutter operation end signal generated at $t_1$ (FIG. 2A), the motor 3 starts rotating (FIG. 2C). In general, because of a mechanical time lag, a signal indicating rotation of the motor 3 will be generated at $t_2$ (FIG. 2B). However, it is also possible to make $t_2$ equal to the same time as $t_1$. At $t_3$ following $t_2$, a first timer signal is generated (FIG. 2D). At this time, the motor is rotating to wind up the film and the signal generator 4 is not generating a film winding end signal. Therefore, the first abnormality detection circuit 6 does not output a resetting signal and the motor 3 continues rotating. At $t_4$ the signal indicating rotation of the motor goes low and becomes a film winding end signal (FIG. 2B). By the signal appearing at this moment, the flip-flop 1 is reset to stop the motor 3. At $t_5$ there is generated a second timer signal (FIG. 2E). However, as shown in FIG. 2B, since a film winding end signal is present, i.e., the absence of a signal indicating rotation of the motor, the second abnormality detection circuit 8 outputs a shot enabling signal.

FIGS. 3A–E show the manner of operation of the apparatus in an abnormal case wherein the film gets jammed midway of being wound up, or wherein there is no longer remaining one complete frame length of film to be wound.

In the same manner as above, at $t_1$ there is generated a shutter operation end signal (FIG. 3A) which causes rotation of the motor 3 (FIG. 3C) and at $t_2$ there is generated a signal indication rotation of motor 3 (FIG. 3B). At $t_3$, a first timer signal is generated (FIG. 3D).

However, in this case, winding of the film is hindered in mid-course of winding due to the above mentioned reason and no further advance of film is allowed. Therefore, no winding end signal is generated at $t_4$, i.e., the signal (FIG. 3B) indicating rotation of the motor remains high, prior to which the motor 3 should have completed winding one frame length of the film. Because of the absence of the film winding end signal (FIG. 3B), the motor 3 attempts to continue further rotation (FIG. 3C). At $t_5$ there is generated the second timer signal (FIG. 3E), and the second abnormality detection circuit 8, to which no winding end signal is being applied at this time, generates, therefore, a signal for resetting the flip-flop 1. Thus, the motor 3 is stopped although no film winding end signal has been generated. It is seen that some time passes before the motor 3 is stopped. However, this time is very short and, therefore, there is almost no possibility of the film being damaged during this time. If desired, a known mechanism for making the motor idle may be employed additionally. In this case, the second timer signal will be used to stop the motor rotating idle.

FIGS. 4A–E show a case wherein film winding beyond the useful length of the film, i.e., the last frame, is erroneously attempted. The result of a random sampling study taught us that the percentage of such erroneous film winding operations approaches about 30%.

Again, at $t_1$ there is generated a shutter operation end signal (FIG. 4A) which causes the motor 3 to start rotating. The motor 3 applies to the film a force tending to wind up it (FIG. 4C). However, since the film is in a position in which no further winding of film is allowable, the motor shaft can not rotate. Therefore, at $t_2$ there is generated no signal indicating rotation of the motor (FIG. 4B), i.e., the signal indicating rotation of the motor remains low. Instead, the film winding end signal continues to exist. As a result, the motor 3 is stopped when the first timer signal is generated at $t_3$ (FIG. 4D).

Figure 5:
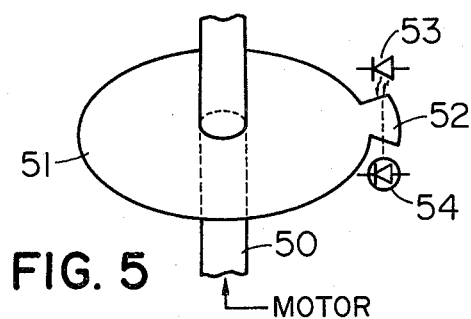
FIG. 5 shows, in a perspective view, one form of the signal generator used in the motor stopping apparatus according to the invention.

While in the above embodiment the signal generator 4 has been shown and described to be of mechanical type, another type of signal generator also may be used in the invention. FIG. 5 shows another embodiment of the signal generator 4.

In FIG. 5, designated by 50 is a shaft which rotates interlocked with the motor 3, and is so sized as to make one revolution per one frame length of film. A beam chopper 51 is fixedly mounted on the shaft 50, and has a projecting blade 52. A light emitting element 53 and a light receiving element 54 are opposed to each other with the blade interposed therebetween. In the starting position shown in FIG. 5, the output of the light receiving element 54 is at a low level. The chopper 51 rotates with the motor 3 and the blade 52 is retracted from the light path extending from the light emitting element 53 to the light receiving element 54. As the blade rotates out of the light path, the output of the light receiving element changes from a low level to a high level, which constitutes the signal (FIGS. 2B and 3B) indicating that the motor 3 is rotating. Upon the completion of winding one frame length of film, the blade 52 again enters the light path between the elements 53 and 54 and stops there. When the blade enters the light path, the output of the light receiving element changes from a high level to a low level, which constitutes the film winding end signal.

It is also possible to use a delayed shutter operation end signal as the time signal mentioned above. It is apparent from FIG. 4 that it will be convenient for detecting an abnormality if the first timer signal is generated as soon as possible after the motor is started. However, in this case, there is the possibility that the film would not be advanced at all if the motor has not started to rotate. Therefore, preferably the first timer signal is generated about midway between $t_1$ and $t_4$ shown in FIG. 2. By selecting the timing for the generation of the first timer signal in this manner, an average timing is obtained which is suitable for all sizes of films.

The above described apparatus for stopping the motor 3 can be simplified in structure to a great extent by functionally substituting a computer M (FIG. 1) for all of flip-flop 1, first and second timers 5 and 7, first and second abnormality detectors 6 and 8 and OR gate 9.

As is understood from the foregoing, the present invention has many advantages over the prior art apparatus. According to the invention, the state of operation of the motor is checked twice after a film winding start signal has been generated. A first check is done when the first timer signal is generated, and a second when the second timer signal is generated. This assures that the motor is stopped at once and without fail when the film is in a position in which no further winding-up of the film is possible. Also, the present invention eliminates the trouble of presetting the number of pictures to be taken which was required by users of some prior art cameras employing motor driven film winding.

While the invention has been particularly shown and described with reference to preferred embodiments thereof, it will be understood by those skilled in the art that the foregoing and other changes in form and details can be made therein without departing from the spirit and scope of the invention.

I claim:

1. An apparatus for stopping the motor of a motor drive mechanism in a camera of the type in which the motor is started upon the occurrence of a film winding start signal and is stopped in response to a film winding end signal being generated upon completion of a film winding operation, said apparatus comprising:
   timer circuit means for generating a first timing signal a first predetermined time after said film winding start signal, said first predetermined time being selected such that it is before the time said film winding end signal is generated during normal operation of the mechanism, and for generating a second timing signal a second predetermined time selected to be after said time said film winding end signal is normally generated, and
   abnormality detection means responsive to the timing signals and to the film winding end signal for producing a stop signal for stopping the motor when said film winding end signal is being generated at the first predetermined time or when no film winding end signal is being generated at the second predetermined time.

2. Apparatus according to claim 1, wherein said first timing signal from said timer circuit means is generated immediately after the rotation of said motor is initiated by said film winding start signal.

3. Apparatus according to claim 1, wherein said first timing signal from said timer circuit means is generated about midway between the film winding start signal and the time the film winding end signal is generated during normal operation.

4. Apparatus according to any one of claim 1, 2 or 3, wherein said abnormality detection means includes a warning device driven by said motor stop signal.

5. Apparatus according to claim 1, further comprising signal generating means for producing an output signal whenever the motor has rotated from a predetermined rotational position corresponding to the start and the end of a film winding operation, the absence of said output signal being said film winding end signal.

6. Apparatus according to claim 5, wherein said signal generating means comprises light emitting means for producing light, light receiving means for receiving the light from the light emitting means, and means rotatable with the motor for interrupting said light received by the light receiving means when the motor is in said predetermined rotational position.

7. Apparatus according to claim 1, wherein said abnormality detection means comprises first and second AND circuits responsive to said first and second timing signals, respectively, and responsive to the presence and to the absence, respectively, of said film winding end signal.

8. Apparatus for stopping the motor of a motor drive mechanism in a camera of the type in which the motor is driven into rotation upon the occurrence of a film winding start signal and is stopped in response to a film winding end signal being generated upon completion of a film winding operation, said apparatus comprising:
   a timer circuit which generates a timing signal a predetermined time after the generation of said film winding start signal and before the time said film winding end signal is generated during normal operation of the mechanism, and
   an abnormality detector for providing a stop signal for stopping the motor when said film winding end signal is being generated at said predetermined time.

9. Apparatus according to claim 8, which further comprises:
   another timer circuit which generates another timing signal another predetermined time selected to be after the time said film winding end signal is normally generated;
   another abnormality detector for producing a stop signal for stopping the motor when no film winding end signal is being generated at said other predetermined time;
   an OR gate for receiving the motor stop signals from both of said abnormality detectors and for outputting a driving signal when it receives at least either one of said motor stop signals; and
   a warning device driven by said driving signal.

10. An apparatus for stopping the motor of a motor drive mechanism in a camera of the type in which the motor is energized upon the occurrence of a start signal that initiates a film winding operation and is de-energized in response to a stop signal generated upon completion of the film winding operation, comprising:
    timer means for producing a first timing signal a first predetermined time after the occurrence of said start signal, said first predetermined time being selected to be less than the time required for completion of the film winding operation, and for producing a second timing signal a second predetermined time after said start signal, said second predetermined time being selected to be greater than the time required for completion of the film winding operation;
    first means responsive to the first timing signal for producing a stop signal if the motor has not advanced beyond a predetermined rotational position at said first predetermined time; and
    second means responsive to the second timing signal for producing a stop signal if the film winding operation has not been completed at said second predetermined time.

11. Apparatus according to claim 10, wherein the motor is in said predetermined rotational position at the beginning and at the end of the film winding operation, and wherein the apparatus further comprises signal generating means for providing a film winding end signal when the motor is in said predetermined rotational position, said first and second means being responsive to said film winding end signal.

12. Apparatus according to claim 11, further comprising warning means responsive to the stop signals produced by said first and second means for providing an indication that a normal film winding operation has not occurred.

* * * * *